US012622348B1

(12) United States Patent     (10) Patent No.:   US 12,622,348 B1

Velez Gonzalez et al.     (45) Date of Patent:    May 12, 2026

(54) RAKE TONGS ADAPTER

(71) Applicants:Jose N. Velez Gonzalez, Isabel, PR (US); Emilio D. Velez Gonzalez, Isabela, PR (US)

(72) Inventors: Jose N. Velez Gonzalez, Isabel, PR (US); Emilio D. Velez Gonzalez, Isabela, PR (US)

( * ) Notice: Subject to any disclaimer, the term of this patent is extended or adjusted under 35 U.S.C. 154(b) by 0 days.

(21) Appl. No.: 19/407,613

(22) Filed: Dec. 3, 2025

Related U.S. Application Data

(63) Continuation-in-part of application No. 18/129,248, filed on Mar. 31, 2023, now Pat. No. 12,568,877.

(60) Provisional application No. 63/729,325, filed on Dec. 7, 2024.

(51) Int. Cl.
    *A01D 7/10*        (2006.01)

(52) U.S. Cl.
    CPC ...................................... *A01D 7/10* (2013.01)

(58) Field of Classification Search
    CPC ............. A01D 7/00; A01D 7/10; A01G 20/43
    See application file for complete search history.

(56) References Cited

U.S. PATENT DOCUMENTS

| | | | | |
|---|---|---|---|---|
| 3,164,945 A | * | 1/1965 | Spencer ................... | A01D 7/10 |
| | | | | 294/50.8 |
| 4,037,397 A | * | 7/1977 | Fiorentino ............... | A01D 7/10 |
| | | | | 294/50.8 |
| 4,953,347 A | * | 9/1990 | Siegfried ................. | A01B 1/00 |
| | | | | 294/50.8 |
| 2022/0248598 A1 | * | 8/2022 | Besler ...................... | A01D 7/10 |
| 2023/0138223 A1 | * | 5/2023 | Birch ....................... | F16B 2/06 |
| | | | | 56/400.12 |

* cited by examiner

*Primary Examiner* — Cathleen R Hutchins

(74) *Attorney, Agent, or Firm* — Luis Figarella

(57)          ABSTRACT

Interface adapters are shown that allow, with minimal modification, the coupling of two separate rakes for use as 'scissor yard waste tongs' while at the same time allowing for their separate use as 'regular' rakes. These adapters provide the significant advantage of allowing ergonomically correct motions for their operators, while they minimize the need to bring additional tools in performing their work tasks.

8 Claims, 14 Drawing Sheets

206

208

500

208

206

600

304'        302'

1

RAKE TONGS ADAPTER

CROSS-REFERENCE TO RELATED APPLICATIONS

This application is a Continuation-in-Part of pending U.S. patent application Ser. No. 18/129,248 titles "Rake Tongs Adapter", filed on Mar. 31, 2023, the disclosure of which is herein incorporated by reference in its entirety.

Additionally, this application claims priority to U.S. Provisional patent application Ser. No. 63/729,325 titled "Rake Tongs Adapter", filed on Dec. 7, 2025, the disclosure of which is herein incorporated by reference in their entirety.

PATENTS CITED

The following documents and references are incorporated by reference in their entirety, Clark (U.S. Pat. No. 4,866, 922), Feldman (U.S. Pat. No. 11,229,159), Oakes (U.S. Pat. Pub. No. 2020/0305359) and Billado et al (U.S. Pat. Pub. No. 2007/0033916).

FIELD OF THE INVENTION

The invention relates generally to the field of landscaping, and in particular to a tool that allows the users to rake and collect debris with minimal effects to their backs.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about an adapter for converting two rakes into scissor tongs, said adapter comprising: a receiver for hosting a central sliding assembly so that the central sliding assembly crosses inside the receiver, said receiver comprising: a top opening for securing the upper portion of a first rake, and a lower opening for securing the lower portion of the same first rake, both of said top and lower openings having rake portions securing components, a central opening having a bolt horizontally across said central opening and said central sliding assembly comprising a top opening for securing the upper handle portion of a second rake, and a lower opening for securing the lower portion of the same second rake, both of said top and lower openings having rake portions securing components wherein said central sliding assembly has a central notched slot covered by a sliding tab that can be opened through a pressing tab kept over said central notched slot by a spring. In another aspect said first rake top and bottom openings securing components, as well as said second rake top and bottom openings securing components include one or more of: screw, nails, rivets, pressure sleeves or chemicals. In yet another aspect said central sliding assembly has two offset ends mounted on opposite sides of said sliding assembly.

In one aspect, the invention is about a method for using an adapter for converting two rakes into scissor tongs, said adapter comprising: a receiver for hosting a central sliding assembly so that the central sliding assembly crosses inside the receiver, said receiver comprising: a top opening for securing the upper portion of a first rake, and a lower opening for securing the lower portion of the same first rake, both of said top and lower openings having rake portions securing components, a central opening having a bolt horizontally across said central opening and said central sliding assembly comprising a top opening for securing the upper handle portion of a second rake, and a lower opening for securing the lower portion of the same second rake, both of said top and lower openings having rake portions securing components wherein said central sliding assembly has a central notched slot covered by a sliding tab that can be opened through a pressing tab kept over said central notched slot by a spring. In another aspect said first rake top and bottom openings securing components, as well as said second rake top and bottom openings securing components include one or more of: screw, nails, rivets, pressure sleeves or chemicals. In yet another aspect said central sliding assembly has two offset ends mounted on opposite sides of said sliding assembly.

Other features and advantages of the present invention will become apparent upon examining the following detailed description of an embodiment thereof, taken in conjunction with the attached drawings, which are provided for purposes of illustration and not of limitation.

Figure 1:
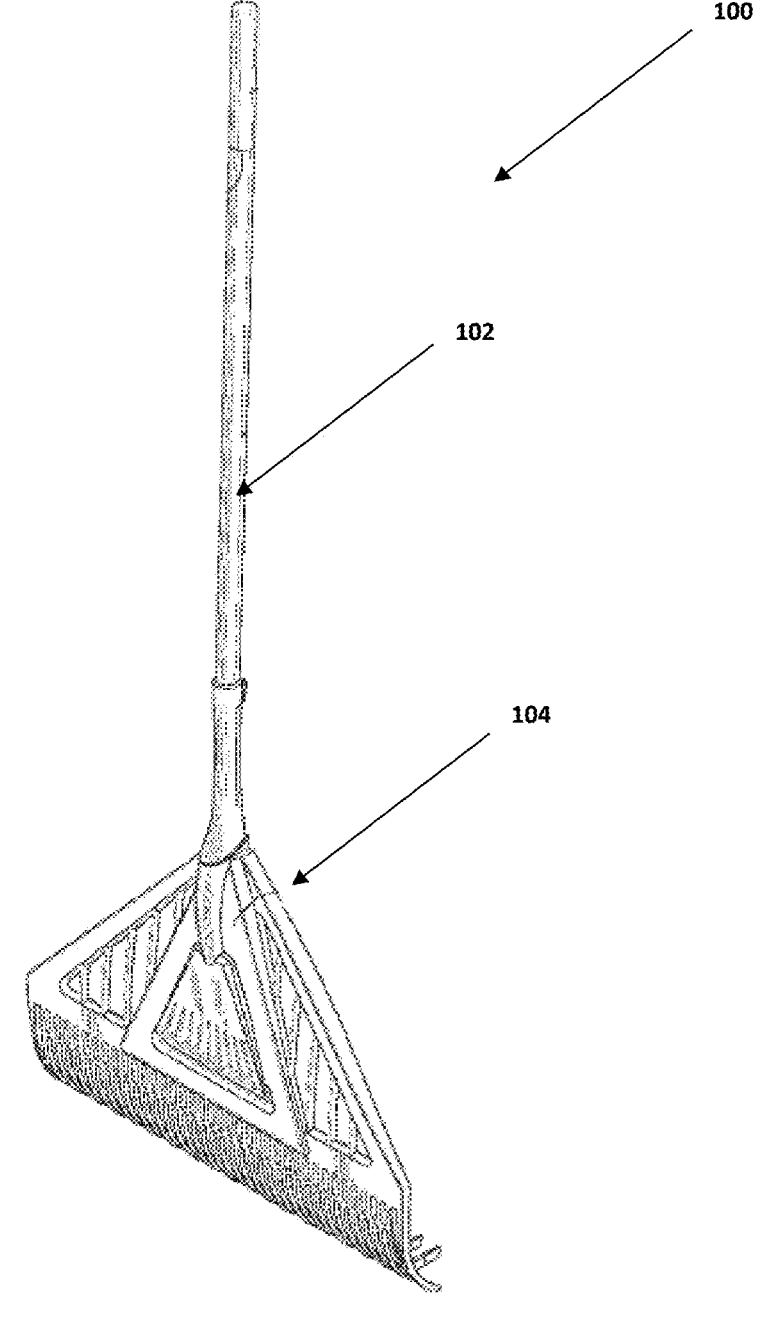
FIGS. 1-4 show various aspects of the simplest combined rakes, according to the prior art.
Figures 2, 3:
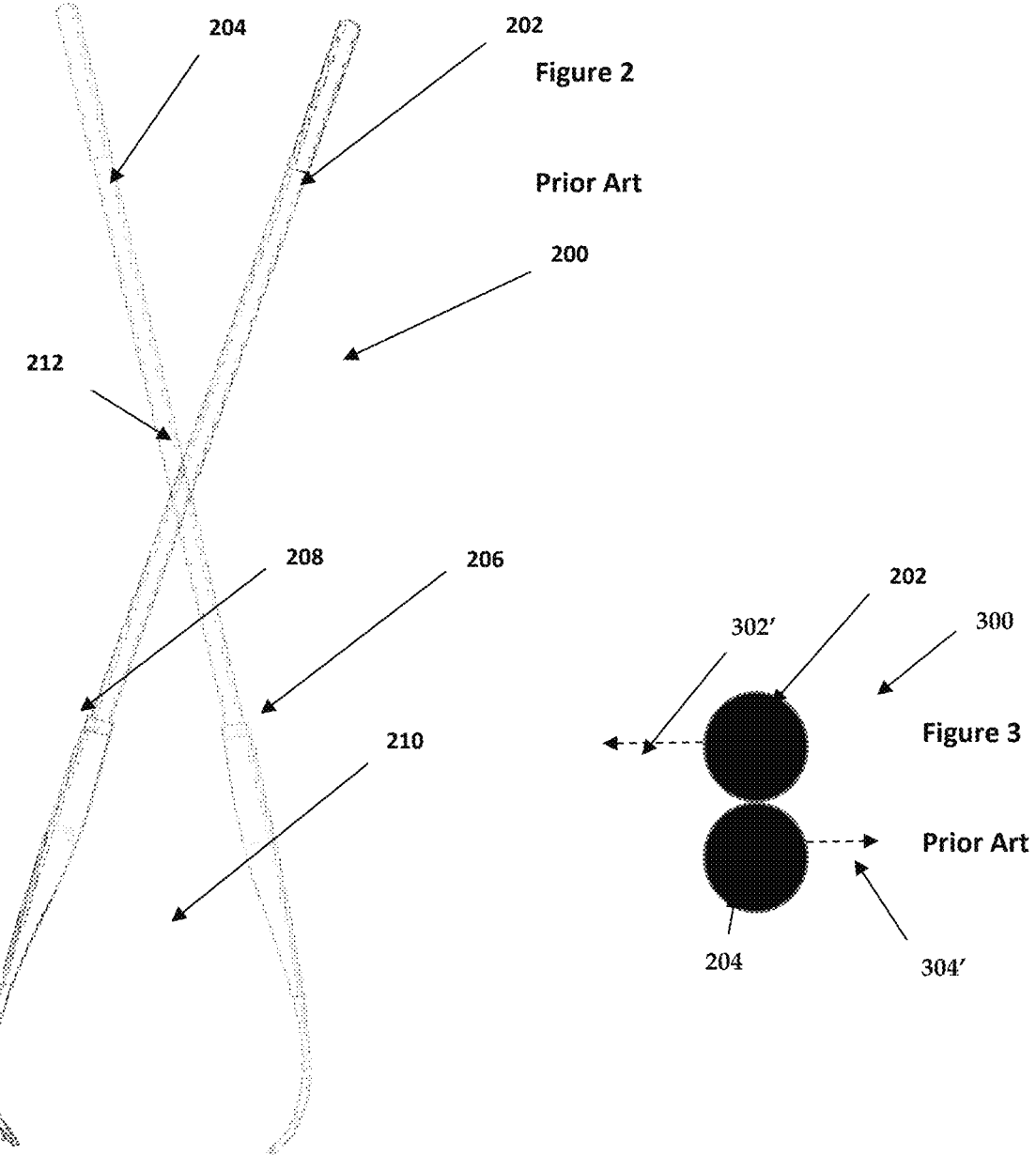
Figure 4:
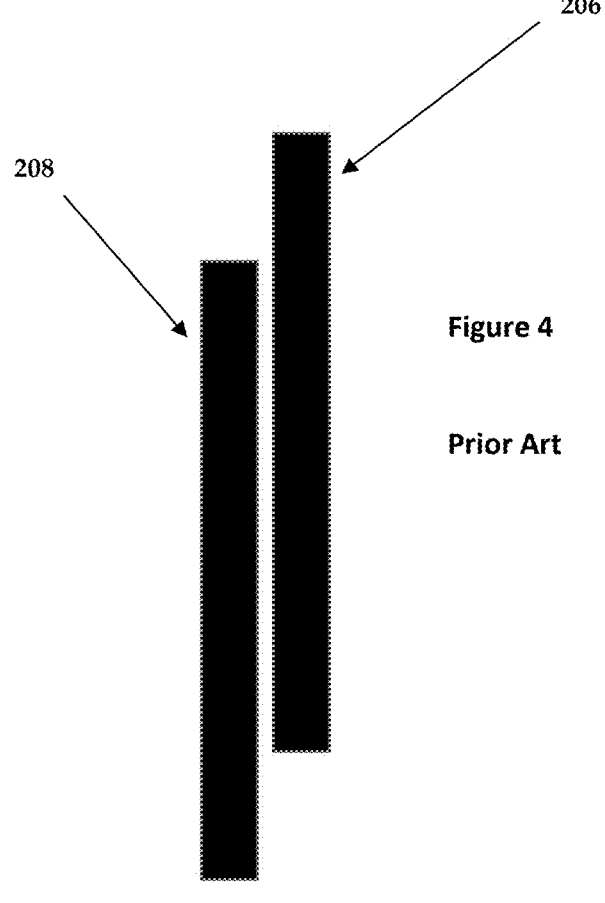
Figures 5, 6:
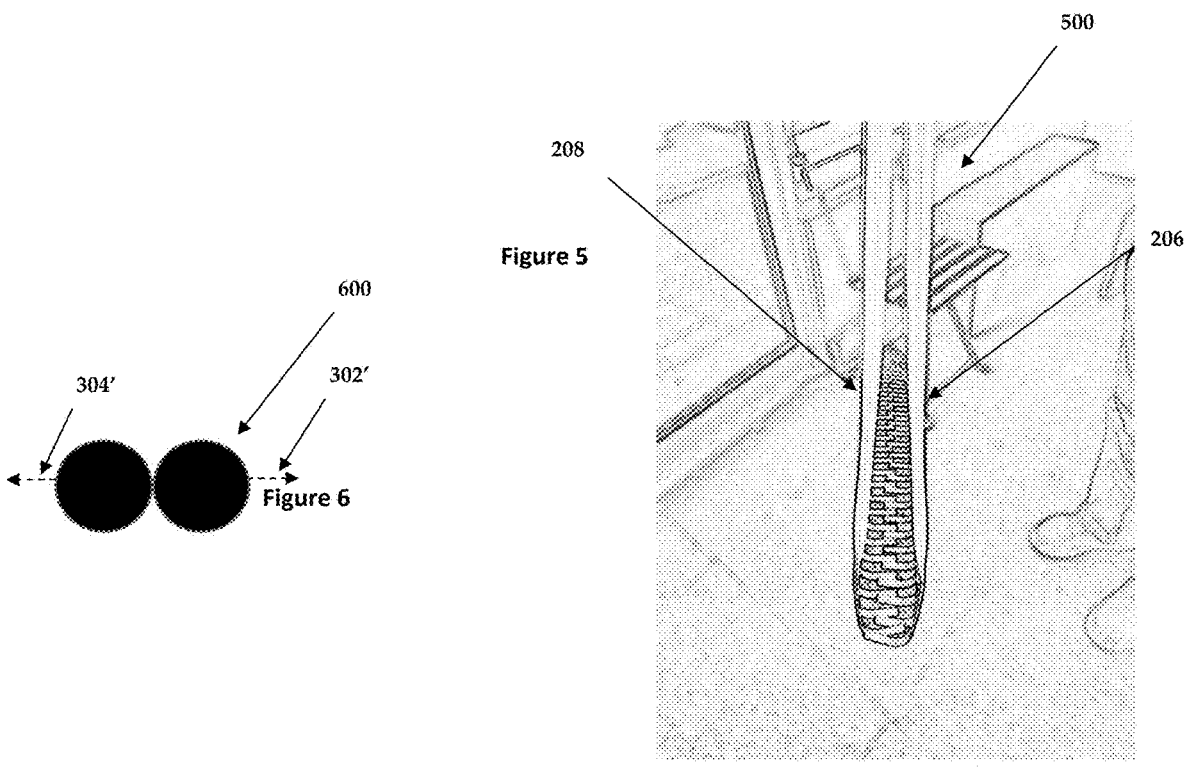
FIG. 5 shows an isometric view of the desired rake head positions for optimal collection, according to an exemplary embodiment of the invention.
FIG. 6 shows a top view of the rake handles position for optimal operator comfort, according to an exemplary embodiment of the invention.
Figures 7, 8:
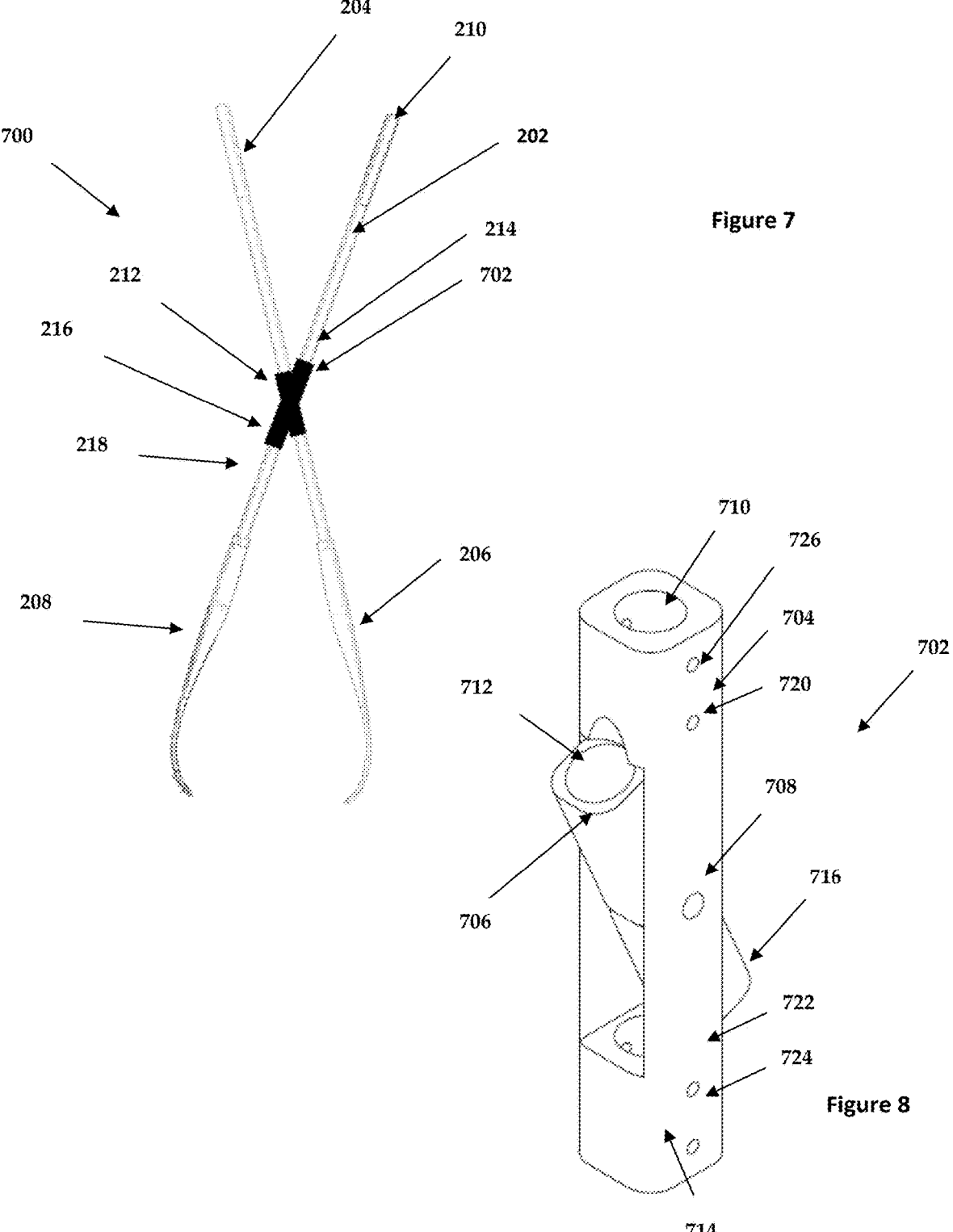
FIG. 7 shows a side view of the rakes with a proposed interface fixture, according to an exemplary embodiment of the invention.
FIG. 8 shows an isometric view of a proposed interface fixture, according to an exemplary embodiment of the invention.
Figure 9:
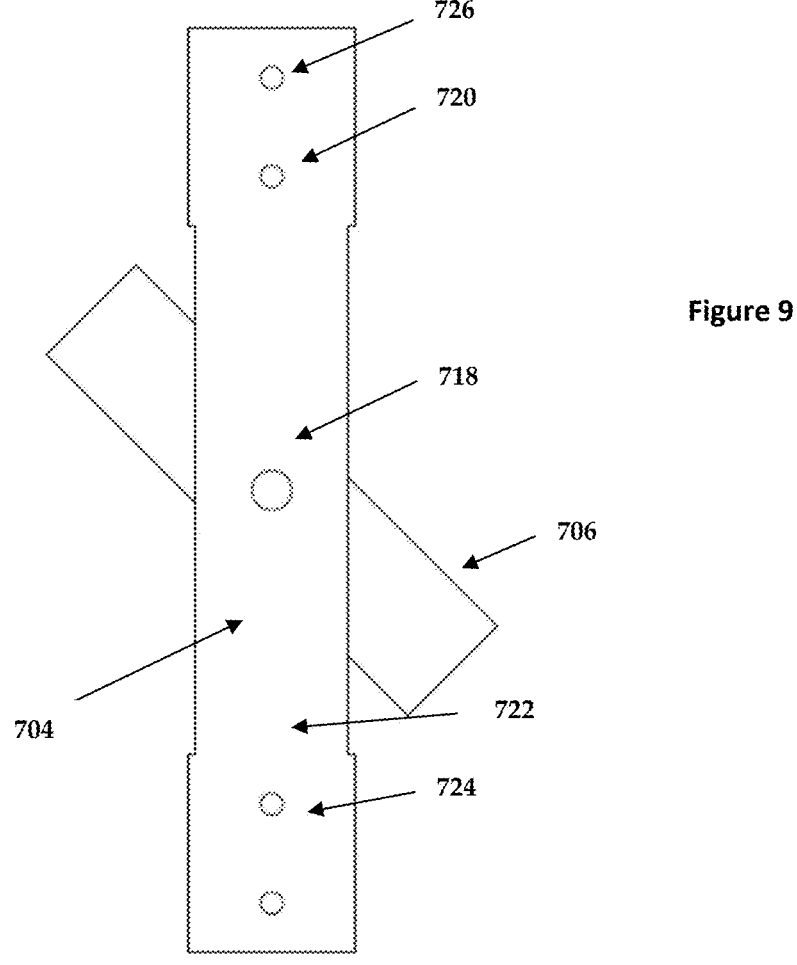
FIG. 9 shows a side view of a proposed interface fixture, according to an exemplary embodiments of the invention.
Figures 10, 11, 12:
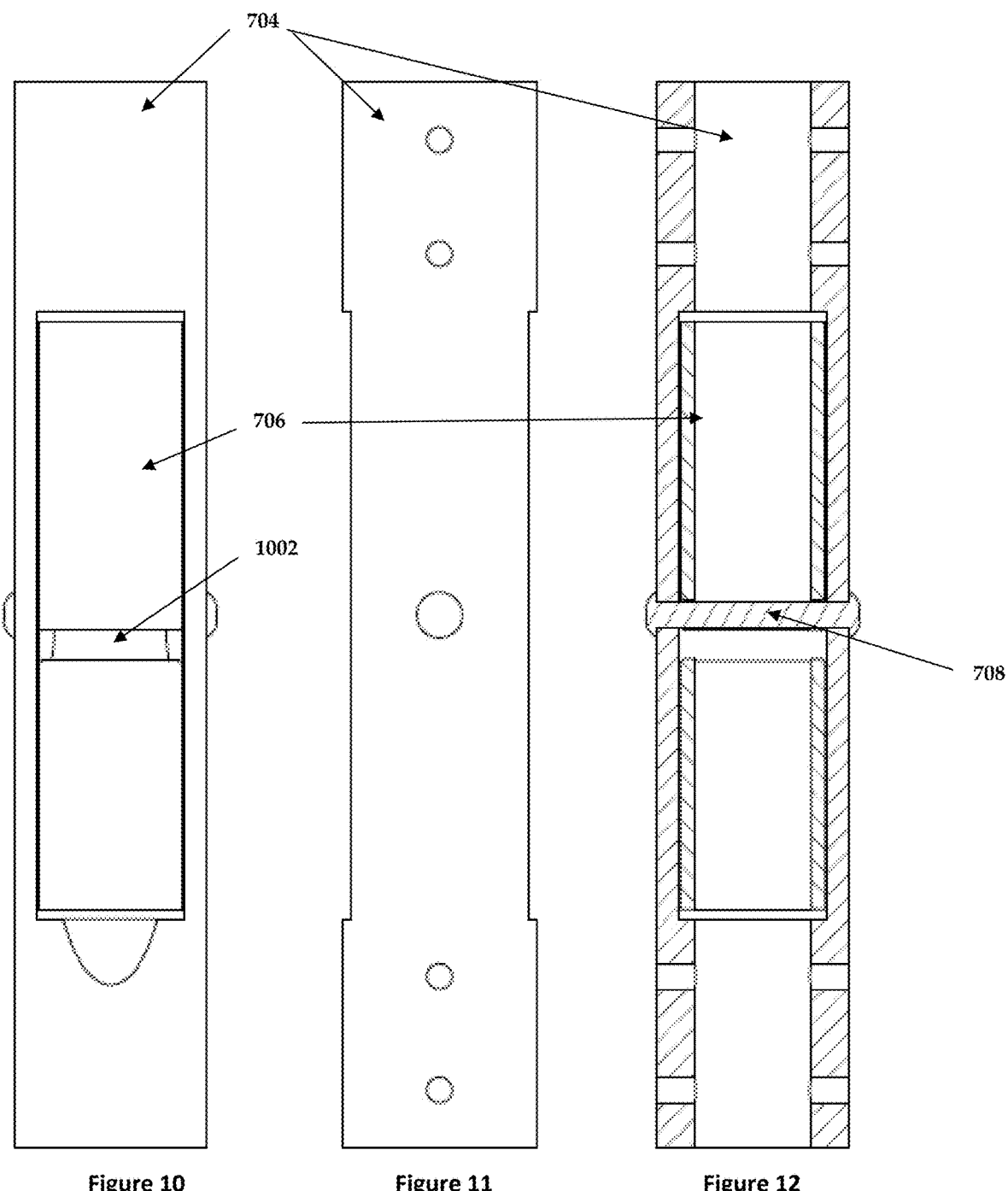
FIG. 10 shows a front view of a proposed interface fixture, according to an exemplary embodiment of the invention.
FIG. 11 shows a side view of a proposed interface fixture receiver, according to an exemplary embodiment of the invention.
FIG. 12 shows a back view of a proposed interface fixture receiver, according to an exemplary embodiment of the invention.
Figure 13:
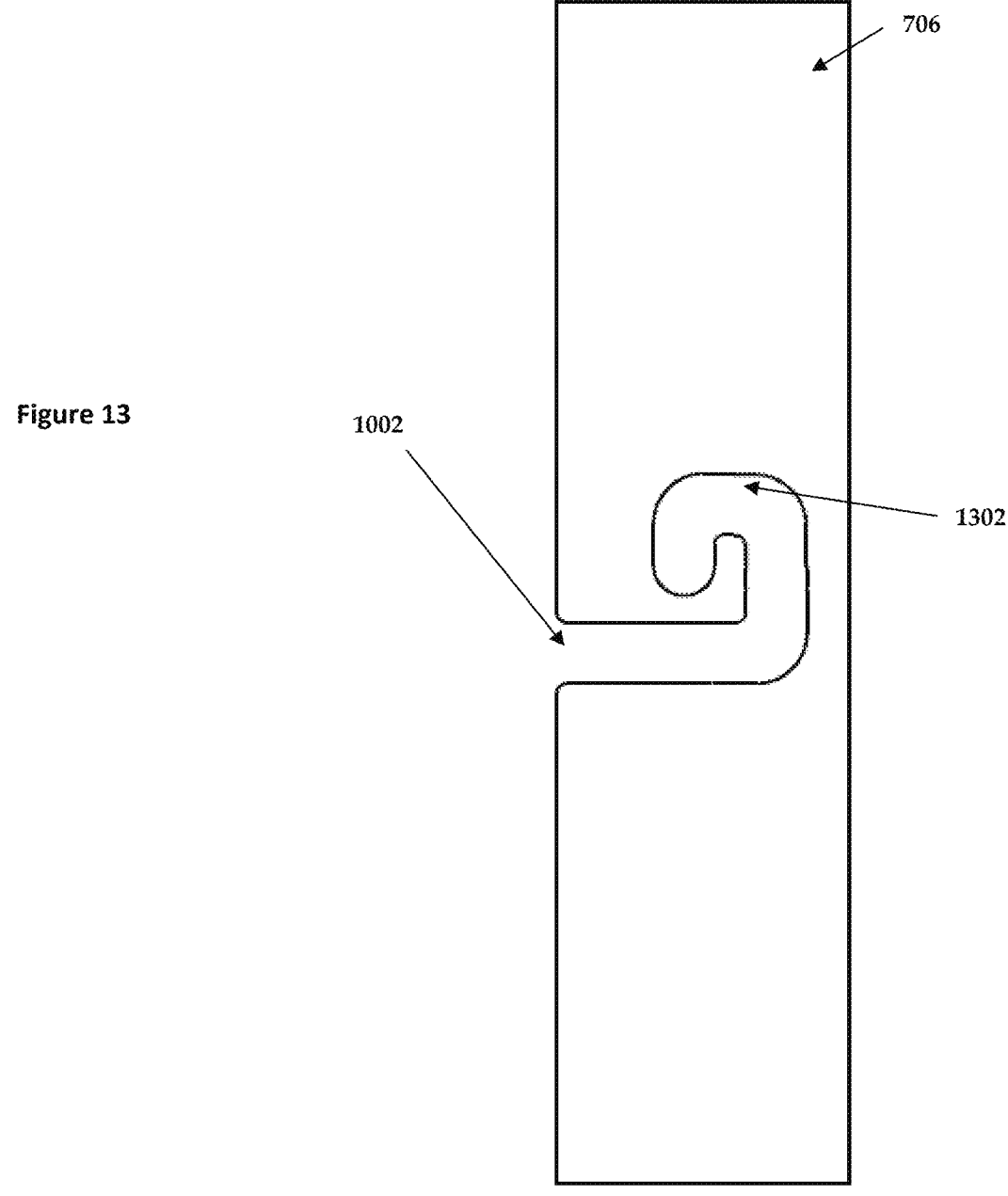
FIGS. 13 and 14 show side views of a proposed interface fixture sliding assemblies, according to exemplary embodiments of the invention.
Figure 14:
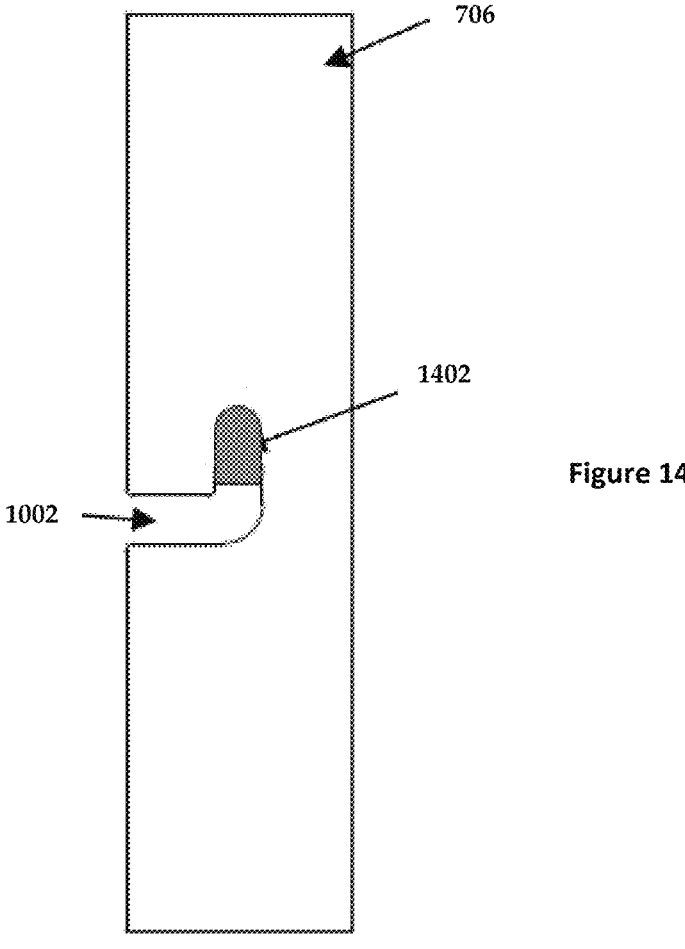
Figure 15:
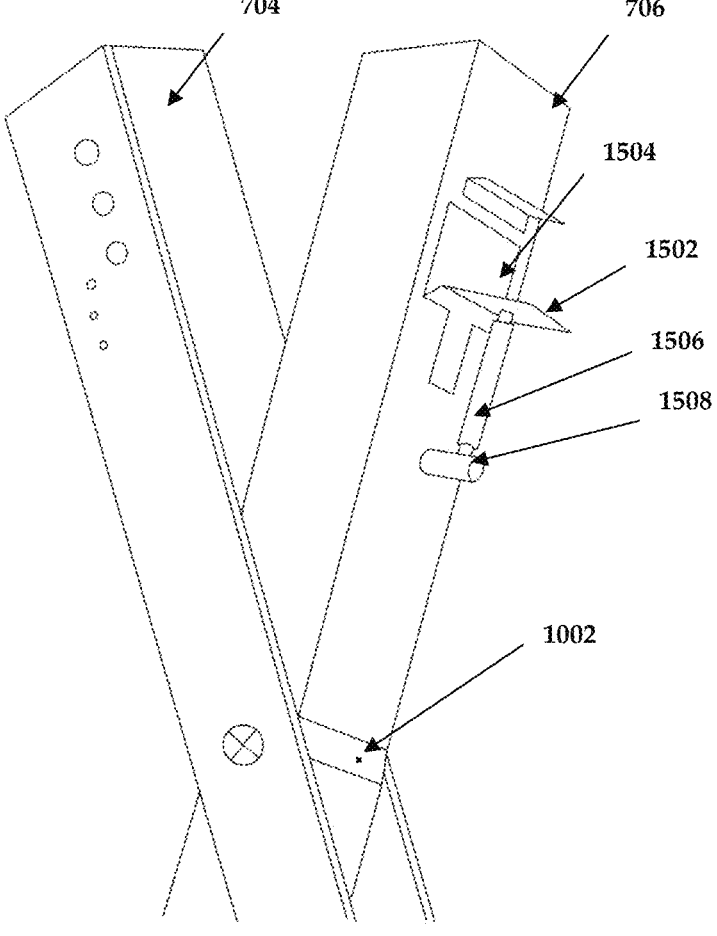
FIG. 15 shows an isometric view of a proposed interface fixture assembly installed inside the proposed interface fixture receiver sliding assembly, according to an exemplary embodiment of the invention.
Figure 16:
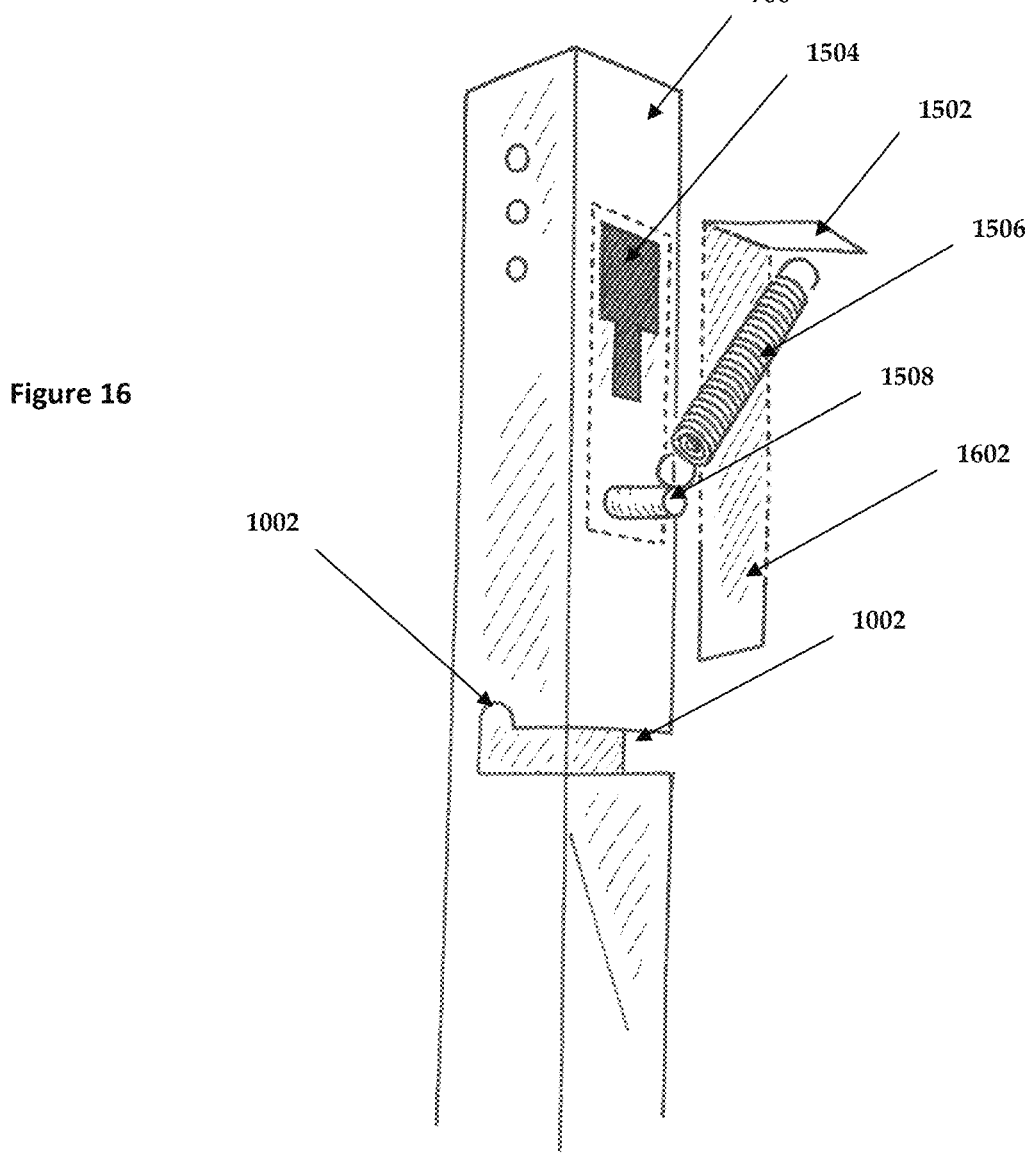
FIG. 16 shows an isometric view of the proposed interface fixture assembly components, according to an exemplary embodiment of the invention.
Figure 17:
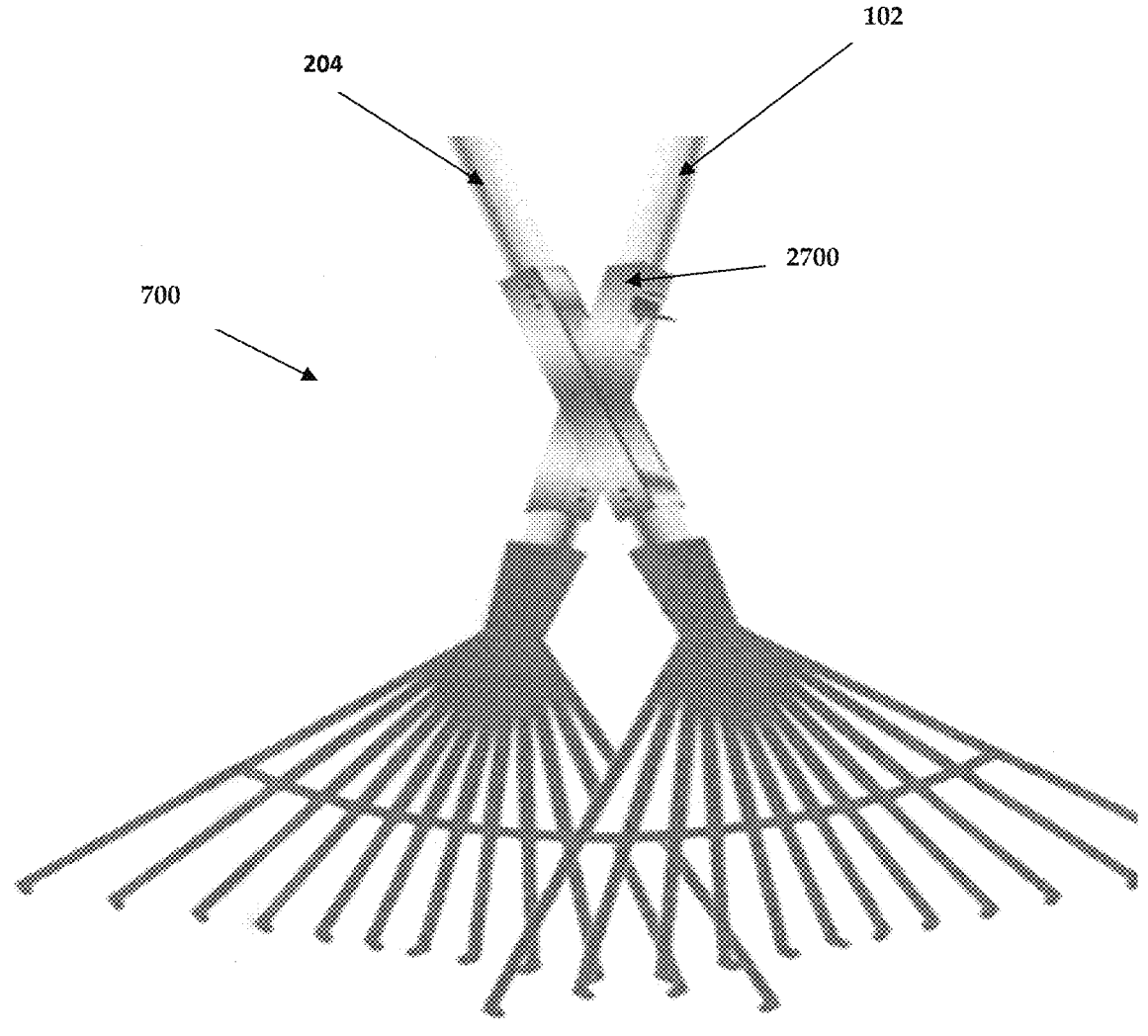
FIGS. 17 and 18 show isometric views of the complete proposed 'scissoring point' unit, according to exemplary embodiments of the invention.
Figure 18:
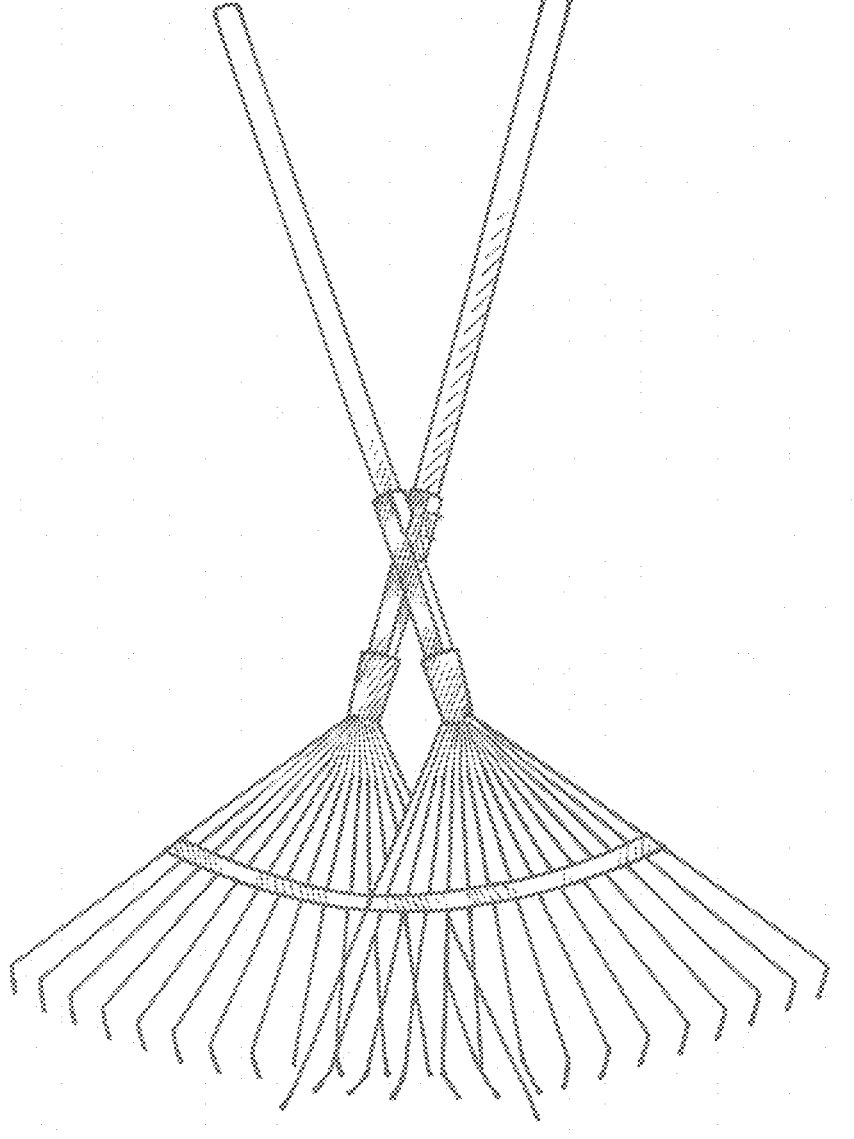

The above-described and other features will be appreciated and understood by those skilled in the art from the following detailed description and drawings.

DETAILED DESCRIPTION OF THE INVENTION

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

When picking up yard waste and/or leaves, a common solution (FIGS. 1-4) has been to convert two separate rakes 100 into 'scissor salad tongs', by joining them 200 in a 'side-by-side' arrangement 300 at a 'scissoring' point 212 along the length of the handle 102/202/204 so that the head 104/206/208 squeezes the waste/leaves in the area 210 within the heads 206/210 in response to the handles motion 302/304. However, a common result of such an arrangement, is that the heads, when closed, are mis-aligned.

The solution in salad tongs, is to make the width of the handle 102 along the point 212 'flat', so that they operate easily and with aligned heads 104/206/208. Unfortunately, if one does that with a rake, the change in the handle 102 from tubular to flat often results in the handle 102 breaking.

A proposed solution (FIGS. 5-12) is to create a non-flat interface fixture 702 comprised of a receiver 704 hosting a sliding assembly 706 that allows for the handles 202/204 to be 600 touching along the separating portions (instead of side-by-side), so that the operator motion when 'tonging' the waste/leaves resembles that of scissors 'separating/joining' 302'/304'. The scissoring point 212 is defined by the bolt 708, along which the sliding assembly 706 rotates when secured and around which the 'scissoring point' 212 rotates.

To create the assembly, a first handle 202 is cut where desired, creating an upper first handle 210 (having a near end 216 at the top and a distal end 214 which is secured into the receiver top opening 710), and a lower first handle 218 having a near end secure into the lower opening 714 of the receiver 704.

The sliding assembly 706 has a top opening 712 and a bottom opening 716 so that the second rake 204 handle may be slid along the complete length of the sliding assembly, secured to said sliding assembly 706, and then a channel 1002 is created (either by cutting/routing if made from wood) or creating/matching if made from metal/plastic). The channel 1002 is created into which the bolt 708 goes, coming to rest into the top notch 1302 when the sliding assembly 708 'rests' within the receiver 204. This provides the 'tong' effect when the handles 202/204 are opened/closed 300'/302' during operation.

In another embodiment (FIGS. 13-18), the sliding assembly 706 has a top space 1402 in the channel 1002 to host the bolt 708. A slide tab 1602 is housed inside the assembly 706 and includes an external pressing tab 1502 which is kept in tension by a spring 1506 anchored to the pin 1508 and the pressing tab 1502. The tension of the spring 1506 keeps the slide tab 1602 covering the opening of the channel 1002, so that the bolt 708 remains in the channel 1002, allowing the assembly 706 to pivot around it. The above keeps this secured until the operator releases it.

Figure 19:
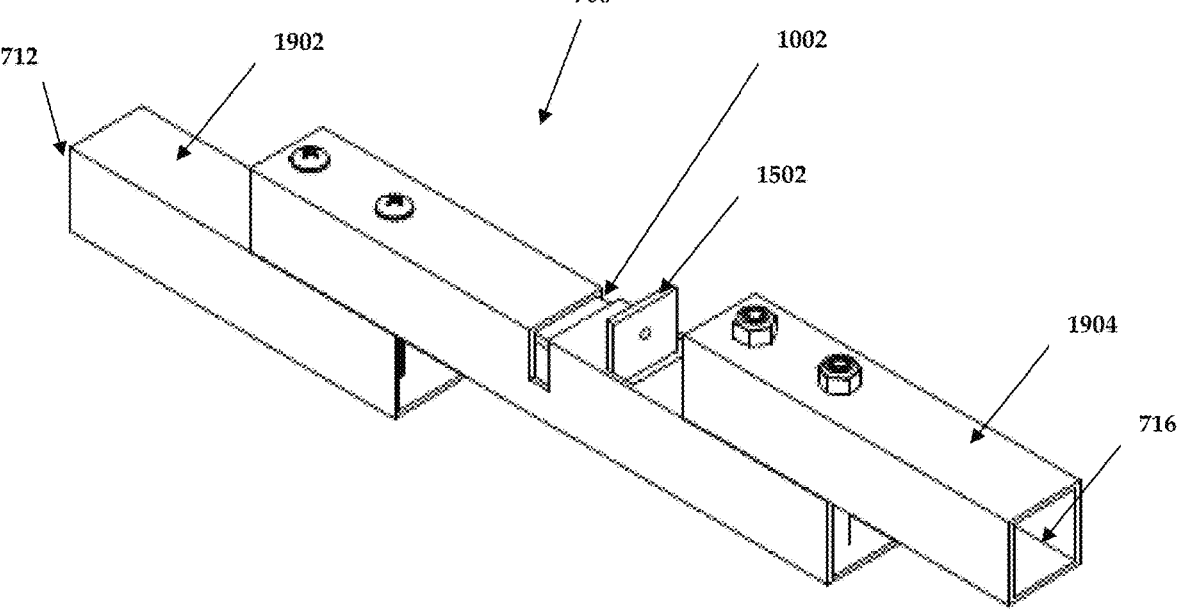
FIG. 19 shows an isometric view of a proposed alternate 'Z' interface fixture assembly, according to exemplary embodiments of the invention.

In yet another embodiment (FIG. 19), the sliding assembly 706 has two offset ends 1902/1904 that are mounted on opposite sides of the sliding assembly 706. In this fashion, the complete sliding assembly 706 may fit inside the receiver 704 when the 'scissoring' is complete and the 'tongs' are closed 500.

CONCLUSION

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the disclosure.

It should be emphasized that the above-described embodiments of the present invention, particularly any "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention.

The invention claimed is:

1. An adapter for converting two rakes into scissor tongs, said adapter comprising: a receiver hosting a central sliding assembly so that the central sliding assembly crosses inside the receiver, said receiver comprising: a top opening securing an upper handle portion of a first rake, and a lower opening securing a lower handle portion of the first rake, both of said top and lower openings having rake portions securing components; said receiver having a central opening having a bolt horizontally across said central opening; and said central sliding assembly comprising a top opening securing an upper handle portion of a second rake, and a lower opening securing a lower handle portion of the second rake, both of said top and lower openings of the central sliding assembly having rake portions securing components; wherein said central sliding assembly has a central notched slot covered by a sliding tab that can be opened through a pressing tab kept over said central notched slot by a spring.

2. The adapter of claim 1 wherein: said receiver top and bottom openings securing components, as well as said central sliding assembly top and bottom openings securing components include one or more of: screw, nails, rivets, pressure sleeves or chemicals.

3. The adapter of claim 2 wherein:
said central sliding assembly has two offset ends mounted on opposite sides of said sliding assembly.

4. The adapter of claim 1 wherein:
said central sliding assembly has two offset ends mounted on opposite sides of said sliding assembly.

5. A method for using an adapter for converting two rakes into scissor tongs, said method comprising: providing a receiver hosting a central sliding assembly so that the central sliding assembly crosses inside the receiver, said receiver comprising: a top opening securing an upper handle portion of a first rake, and a lower opening securing a lower handle portion of the first rake, both of said top and lower openings having rake portions securing components; said receiver having a central opening having a bolt horizontally across said central opening; and said central sliding assembly comprising a top opening securing an upper handle portion of a second rake, and a lower opening securing a lower handle portion of the second rake, both of said top and lower openings of the central sliding assembly having rake portions securing components; wherein said central sliding assembly has a central notched slot covered by a sliding tab that can be opened through a pressing tab kept over said central notched slot by a spring.

6. The method of claim 5 wherein:
said first rake top and bottom openings securing components, as well as said second rake top and bottom openings securing components include one or more of:
screw, nails, rivets, pressure sleeves or chemicals.

7. The adapter of claim 6 wherein:
said central sliding assembly has two offset ends mounted on opposite sides of said sliding assembly.

8. The adapter of claim 5 wherein:
said central sliding assembly has two offset ends mounted on opposite sides of said sliding assembly.

* * * * *